United States Patent
Shen et al.

(10) Patent No.: US 9,563,825 B2
(45) Date of Patent: Feb. 7, 2017

(54) CONVOLUTIONAL NEURAL NETWORK USING A BINARIZED CONVOLUTION LAYER

(71) Applicant: Adobe Systems Incorporated, San Jose, CA (US)

(72) Inventors: Xiaohui Shen, San Jose, CA (US); Haoxiang Li, Kearny, NJ (US); Zhe Lin, Fremont, CA (US); Jonathan W. Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 187 days.

(21) Appl. No.: 14/549,350

(22) Filed: Nov. 20, 2014

(65) Prior Publication Data

US 2016/0148078 A1    May 26, 2016

(51) Int. Cl.
G06K 9/66    (2006.01)
G06N 3/04    (2006.01)
G06K 9/46    (2006.01)
G06K 9/62    (2006.01)

(52) U.S. Cl.
CPC .............. *G06K 9/66* (2013.01); *G06K 9/4628* (2013.01); *G06K 9/6267* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 6,819,790 B2 | 11/2004 | Suzuki et al. |
| 6,820,897 B2 | 11/2004 | Breed et al. |
| 7,219,085 B2 | 5/2007 | Buck et al. |
| 7,319,780 B2 | 1/2008 | Fedorovskaya et al. |
| 7,346,196 B2 | 3/2008 | Gin |
| 7,603,000 B2 | 10/2009 | Zheng et al. |
| 7,634,137 B2 | 12/2009 | Simard et al. |
| 7,813,822 B1 | 10/2010 | Hoffberg |
| 8,441,548 B1 | 5/2013 | Nechyba et al. |

(Continued)

OTHER PUBLICATIONS

"Notice of Allowance", U.S. Appl. No. 14/550,800, Mar. 29, 2016, 8 pages.

(Continued)

*Primary Examiner* — Wesley Tucker
(74) *Attorney, Agent, or Firm* — Wolfe-SBMC

(57) ABSTRACT

A convolutional neural network is trained to analyze input data in various different manners. The convolutional neural network includes multiple layers, one of which is a convolution layer that performs a convolution, for each of one or more filters in the convolution layer, of the filter over the input data. The convolution includes generation of an inner product based on the filter and the input data. Both the filter of the convolution layer and the input data are binarized, allowing the inner product to be computed using particular operations that are typically faster than multiplication of floating point values. The possible results for the convolution layer can optionally be pre-computed and stored in a look-up table. Thus, during operation of the convolutional neural network, rather than performing the convolution on the input data, the pre-computed result can be obtained from the look-up table.

20 Claims, 6 Drawing Sheets

(56) References Cited

U.S. PATENT DOCUMENTS

| | | | |
|---|---|---|---|
| 8,463,025 B2* | 6/2013 | Melvin | G06K 9/00979 382/156 |
| 9,141,916 B1* | 9/2015 | Corrado | G06N 3/0454 |
| 9,418,319 B2 | 8/2016 | Shen et al. | |
| 2008/0159589 A1* | 7/2008 | Benyoub | G06K 9/38 382/101 |
| 2014/0279773 A1* | 9/2014 | Chen | G06N 3/08 706/20 |
| 2015/0170001 A1* | 6/2015 | Rabinovich | G06K 9/66 382/110 |
| 2016/0148079 A1 | 5/2016 | Shen et al. | |
| 2016/0307074 A1 | 10/2016 | Shen et al. | |

OTHER PUBLICATIONS

"Supplemental Notice of Allowance", U.S. Appl. No. 14/550,800, May 19, 2016, 6 pages.

Sun, "Deep Convolutional Network Cascade for Facial Point Detection", In Proceedings of IEEE Conference on Computer Vision and Pattern Recognition (CVPR), 2013., Jun. 2013, pp. 3476-3483.

Chen, et al., "Joint Cascade Face Detection and Alignment", European Conference on Computer Vision (ECCV), 2014, 2014, 14 pages.

Li, et al., "Efficient Boosted Exemplar-based Face Detection", CVPR 2014, 2014, 8 pages.

Shen, et al., "Detecting and Aligning Faces by Image Retrieval", IEEE Conference on Computer Vision and Pattern Recognition (CVPR), 2013, pp. 4321-4328.

Zhu, et al., "Face Detection, Pose Estimation, and Landmark Localization in the Wild", 2012 IEEE Conference on Computer Vision and Pattern Recognition, 2012, 8 pages.

"Non-Final Office Action", U.S. Appl. No. 15/196,478, Aug. 26, 2016, 7 pages.

* cited by examiner

CONVOLUTIONAL NEURAL NETWORK USING A BINARIZED CONVOLUTION LAYER

BACKGROUND

As computing technology has advanced, computers have become increasingly used in many different manners. Various techniques and structures have been developed to allow these different uses, one of which is referred to as a neural network. A neural network, also referred to as an artificial neural network, is a computational model that includes multiple functions (oftentimes referred to as neurons) configured in multiple layers, and that generates an output based on some input. Neural networks are useful in different situations, such as pattern recognition, classification, and so forth. However, neural networks are not without their problems. One such problem is that the analysis performed by the neural network can take a significant amount of time, resulting in slow performance of the neural network. This slow performance can lead to user frustration with their computers.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, input data that is a set of training inputs for a convolutional neural network is obtained. The convolutional neural network includes multiple layers, one of the multiple layers including a convolution layer, and the convolution layer including one or more filters. The convolutional neural network is trained based on the set of training inputs, and the convolution layer is binarized by converting parameters of the one or more filters from floating point to binary values.

In accordance with one or more aspects, input data that is to be analyzed by a convolutional neural network is obtained. The convolutional neural network includes multiple layers, one of the multiple layers including a convolution layer, and the convolution layer including one or more filters. Each of the one or more filters has been binarized by being converted from floating point to binary values. The input data is binarized by converting the input data to binary values. The input data is analyzed using the convolutional neural network, and a result of the analyzing is output. The analyzing includes determining, at the convolution layer, a convolution of the binarized one or more filters over the binarized input data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

A convolutional neural network using a binarized convolution layer is discussed herein. A convolutional neural network is trained to analyze input data in various different manners, such as to perform classification, regression, or other data processing. The convolutional neural network includes multiple layers, one of which is a convolution layer that performs a convolution, for each of one or more filters in the convolution layer, of the filter over the input data. The convolution includes generation of an inner product based on the filter and the input data. Both the filter of the convolution layer and the input data are binarized. Binarizing data (whether the convolution layer or the input data) refers to representing the data as a linear combination of bases, each such linear combination including at least one basis that is binary data, and a corresponding coefficient. Binarizing the filter and the convolution layer allows the inner product to be computed during convolution using particular operations that are typically faster than multiplication of floating point values, resulting in the speed of operation of the convolution layer, and thus the convolutional neural network, being increased.

The speed of operation of the convolution layer can optionally be further increased using a look-up table. The binarization of the convolution layer reduces, for a given filter in the convolution layer, the number of possible binary patterns over given input data to a relatively small number. Given this relatively small number of possible binary patterns (relative to the number that would be possible without binarization), the possible results for the convolution layer can be pre-computed and stored in a look-up table. Thus, during operation of the convolutional neural network, rather than performing the convolution on the input data, the pre-computed result can be obtained from the look-up table.

Figure 1:
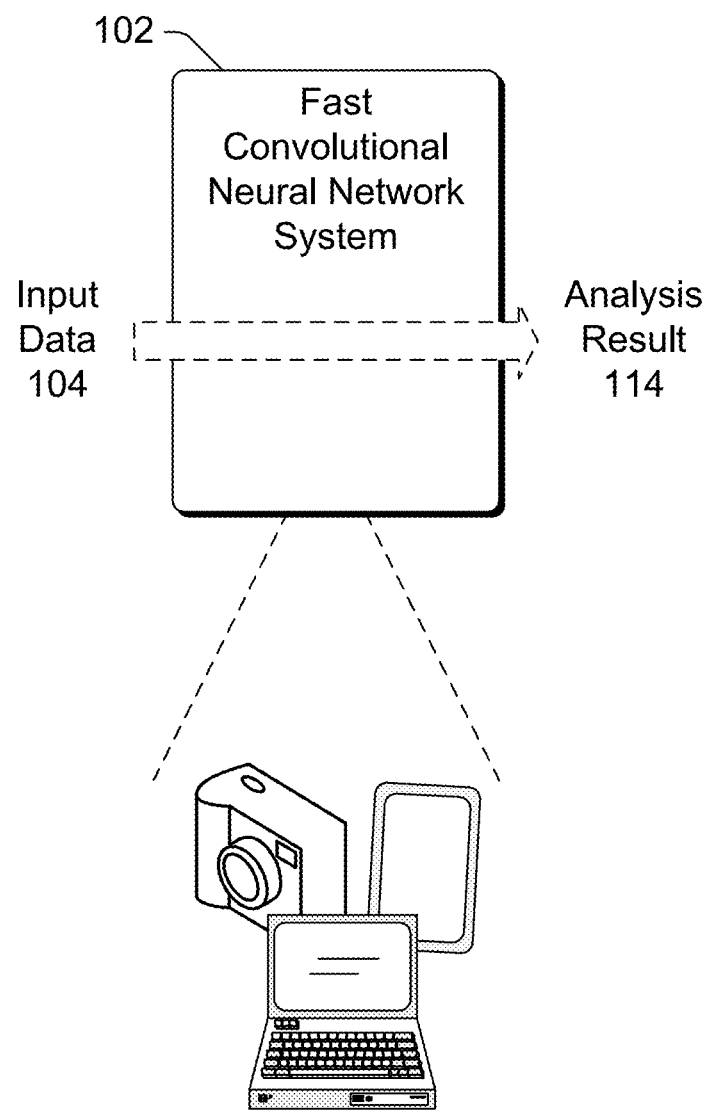
FIG. 1 illustrates an example of a convolutional neural network using a binarized convolution layer in accordance with one or more embodiments.

FIG. 1 illustrates an example of a convolutional neural network using a binarized convolution layer in accordance with one or more embodiments. A fast convolutional neural network system 102 can be implemented by one or more of a variety of different types of devices. For example, the fast convolutional neural network system 102 can be implemented by a desktop computer, a server computer, a laptop or netbook computer, a tablet or notepad computer, a set-top box communicatively coupled to a display device, a television or other display device, a cellular or other wireless phone (e.g., a smart phone), a game console, an automotive computer, a digital camera, a scanner or copier, and so forth. Thus, devices implementing the fast convolutional neural network system 102 may range from full resource devices with substantial memory and processor resources (e.g., personal computers, game consoles) to low-resource devices with limited memory and/or processing resources (e.g., digital cameras, mobile devices).

The fast convolutional neural network system 102 obtains input data 104 and analyzes the input data 104 to generate an analysis result 114, which is output by the fast convolutional neural network system 102. The fast convolutional neural network system 102 can perform various analysis on the input data 104, such as classification, regression, or other data processing. The input data 104 can be image data, video data, audio data, or other types of data. For example, the fast convolutional neural network system 102 can perform image classification, speech recognition, natural language processing, and so forth.

The system 102 is referred to as a fast convolutional neural network system because the system 102 uses a convolutional neural network that is configured to increase the speed at which the analysis result 114 is generated. This configuration of the convolutional neural network includes binarization of the convolution layer of convolutional neural network, and optionally use of a look-up table in the convolutional neural network to obtain a pre-computed result rather than performing the convolution on the input data.

Figure 2:
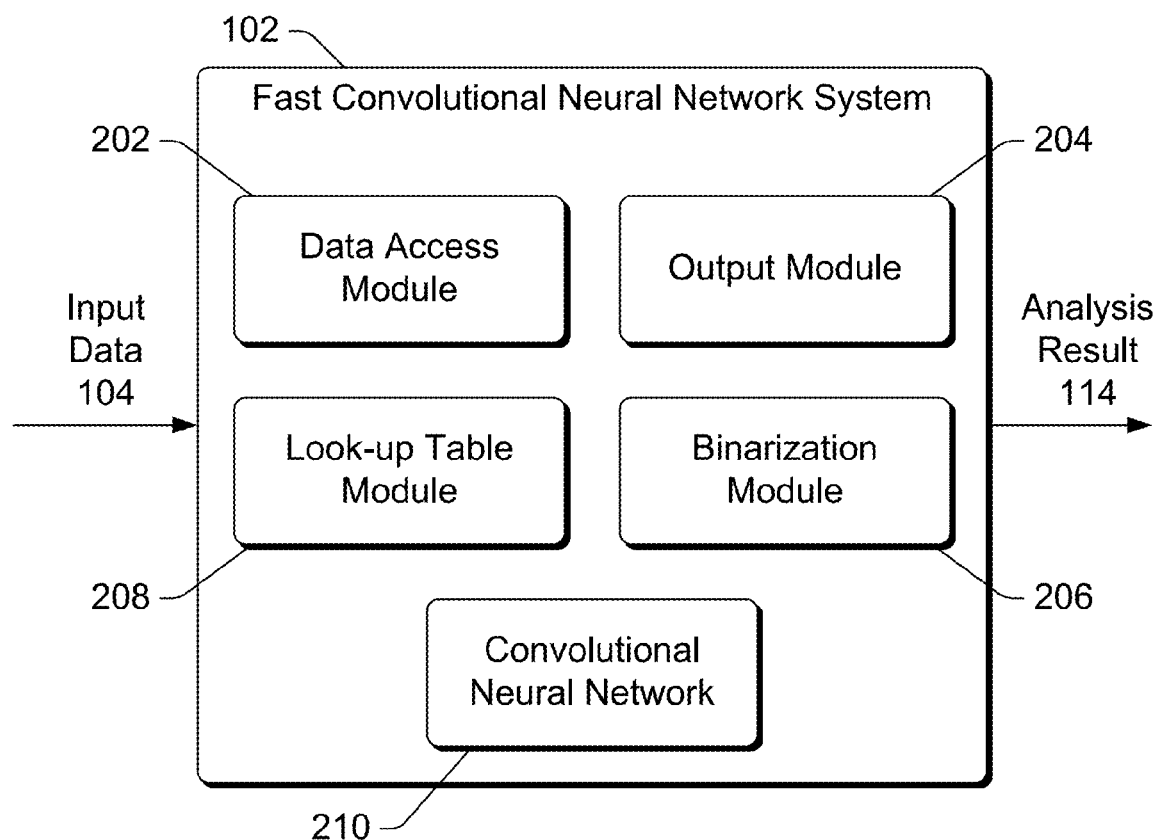
FIG. 2 illustrates an example fast convolutional neural network system in accordance with one or more embodiments.

FIG. 2 illustrates an example fast convolutional neural network system 102 in accordance with one or more embodiments. The fast convolutional neural network system 102 includes a data access module 202, an output module 204, a binarization module 206, a look-up table module 208, and a convolutional neural network 210. Although particular functionality is discussed herein with reference to particular modules, it should be noted that the functionality of individual modules discussed herein can be separated into multiple modules, and/or at least some functionality of multiple modules discussed herein can be combined into a single module. Furthermore, it should be noted that in some situations not all of the modules illustrated in FIG. 2 need be included in the system 102. For example, the system 102 may not support use of a look-up table, and thus the system 102 may not include the look-up table module 208.

The data access module 202 obtains the input data 104. The data access module 202 can obtain the input data 104 in various manners and from various sources, and can obtain the data from another component of the device implementing the system 102 or from a separate device. For example, the module 202 can obtain the input data 104 from an image capture component of the device implementing the system 102, retrieve the input data 104 from a storage device coupled to the device implementing the system 102, retrieve the input data 104 from a storage device accessed via a network, and so forth.

The convolutional neural network 210 analyzes the input data 104 in various manners as discussed above. The convolutional neural network 210 is trained to perform the desired analysis, the training being performed on a set of training data and results, and the convolutional neural network 210 learning the analysis based on the set of training data and results. The convolutional neural network includes multiple layers, and can include one or more layers of each of one or more different types of layers. These types of layers can include, for example, a convolution layer, a pooling layer, a normalization layer, and a fully connected layer.

The binarization module 206 increases the speed at which the convolutional neural network 210, once trained, can analyze the input data 104. The binarization module 206 binarizes values of the input data and/or values of one or more layers of the convolutional neural network 210 (e.g., one or more convolution layers). By binarizing values of the input data 104 and values of one or more layers of the convolutional neural network 210, some of the computations performed by the convolutional neural network 210 can be performed more quickly. Various operations can be performed to increase the speed at which the computations are performed relative to the speed at which floating point operations are performed, as discussed in more detail below.

The look-up table module 208 can further increase the speed at which the convolutional neural network 210, once trained, can analyze the input data 104. Given the binarization of the input data 104 and one or more layers of the convolutional neural network 210, a limited number of possible computations can be performed for a particular layer and the input data 104. These possible computations can be pre-determined and stored in a look-up table corresponding to the convolutional neural network 210, reducing the number of computations that are performed when analyzing the input data 104 as discussed in more detail below.

The output module 204 outputs the analysis result 114. The analysis result can be output in different manners based on the type of the input data 104 and the analysis performed by the convolutional neural network 210. For example, the output module 204 can display an image with boxes or circles around identified faces, the output module 204 can provide an indication of classification or identification to another component or module for processing, the output module 204 can store the analysis result 114 in a data file or as metadata associated with the input data 104, and so forth.

Figure 3:
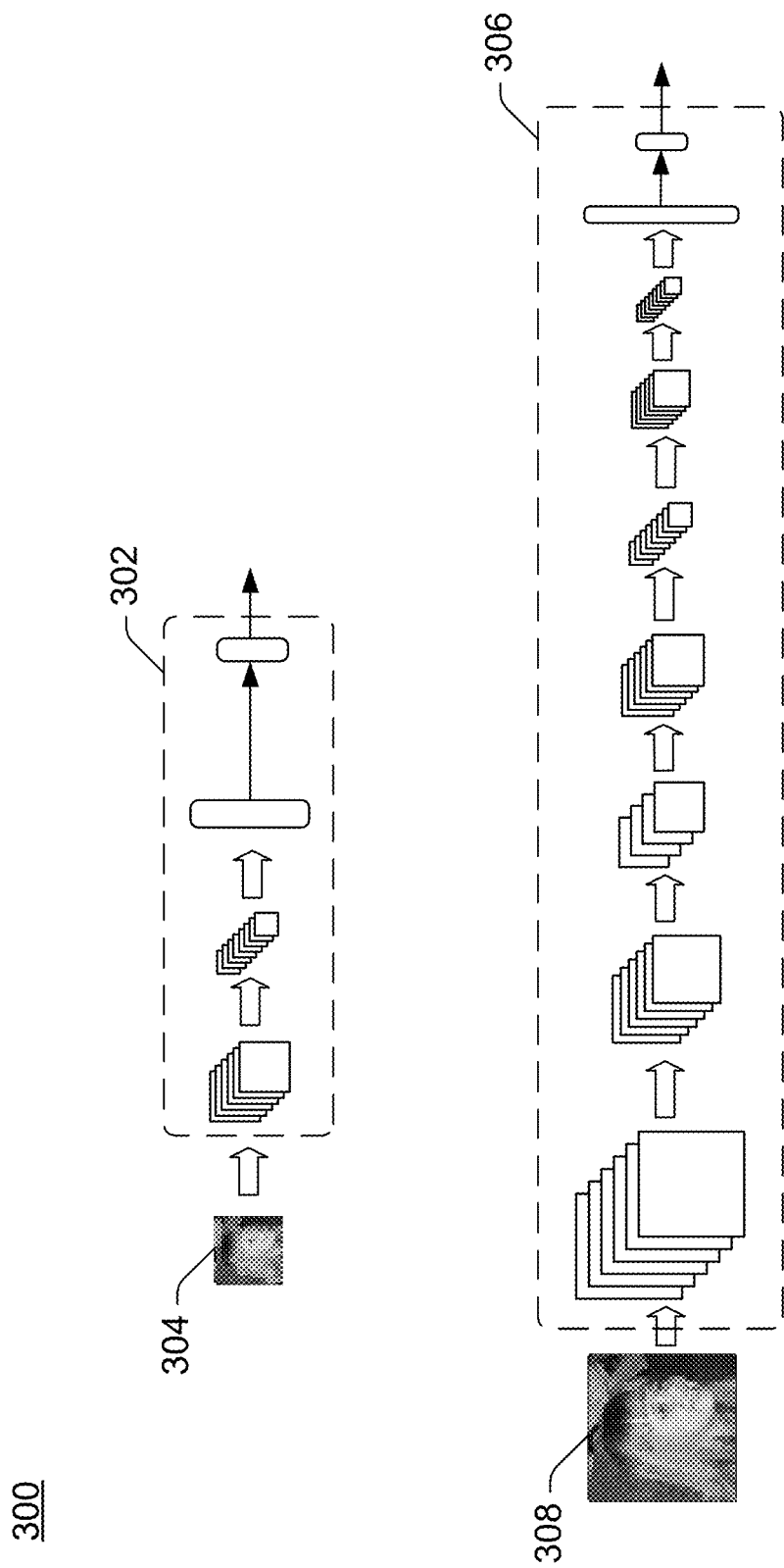
FIG. 3 illustrates examples of a fast convolutional neural network in accordance with one or more embodiments.

FIG. 3 illustrates examples 300 of a fast convolutional neural network in accordance with one or more embodiments. The examples 300 include a convolutional neural network 302 that is shallow, containing only a few layers. For example, the convolutional neural network 302 can include a convolution layer, followed by a pooling layer, followed by a fully connected layer. The convolutional neural network 302 is illustrated as receiving and analyzing an input image 304 (e.g., to identify a face in the input image 304), although the convolutional neural network 302 can alternatively be used with other types of input data. The convolution layer of the convolutional neural network 302 is binarized, as discussed in more detail below.

The examples 300 also include a convolutional neural network 306 that is a deeper convolutional neural network, including several layers. For example, the convolutional neural network 306 can include a convolution layer, followed by a pooling layer, followed by a normalization layer, followed by a convolution layer, followed by a normalization layer, followed by a pooling layer, followed by a fully-connected layer. Thus, the convolutional neural network 306 can include multiple convolution layers. The convolutional neural network 306 is illustrated as receiving and analyzing an input image 308 (e.g., to identify a face in the input image 308), although the convolutional neural network 306 can alternatively be used with other types of input data. One or more of the convolution layers of the convolutional neural network 306 are binarized, as discussed in more detail below.

The layers in a convolutional neural network operate on the input data (either directly or as operated on by a previous layer in the convolutional neural network) in an order from the beginning of the convolutional neural network to the ending of the convolutional neural network. The beginning of the convolutional neural network is the layer that receives the input data and is the initial layer of the convolutional neural network to operate on the data, and the ending of the convolutional neural network is the layer that outputs a result of the convolutional neural network. A layer that operates on data in the convolutional neural network prior to another layer is referred to as being an earlier layer than the other layer or upstream from the other layer. A layer that operates on data in the convolutional neural network following or after operation on data by another layer is referred to as being a later layer relative to the other layer or downstream from the other layer.

Each convolution layer of a convolutional neural network has numerous filters that are applied to the input data (or to data received from a previous layer in the convolutional neural network). When applying these filters, an inner product between two vectors is calculated for each portion of the input data (e.g., each pixel of input image data). By binarizing the filters in the convolution layer, as well as the input data, this inner product is an inner product of binary vectors rather than floating point values. The inner product of two binary vectors can be computed using particular operations (e.g., the bitwise logical AND and population count (POPCNT) instructions) that are typically faster in operation than multiplication of floating point values. Given that the analysis on the input data may involve thousands or tens of thousands of these inner products being computed, the binarization of the filters and input data improve the speed at which the analysis can be performed.

It should be noted that by binarizing the filters and input data, an approximation of the filters and the input data is generated. This approximation yields convolution results that are approximates of the convolution results that would be generated using the floating point values, but are substantially close to the same results and thus can be used as an accurate approximation.

Figure 4:
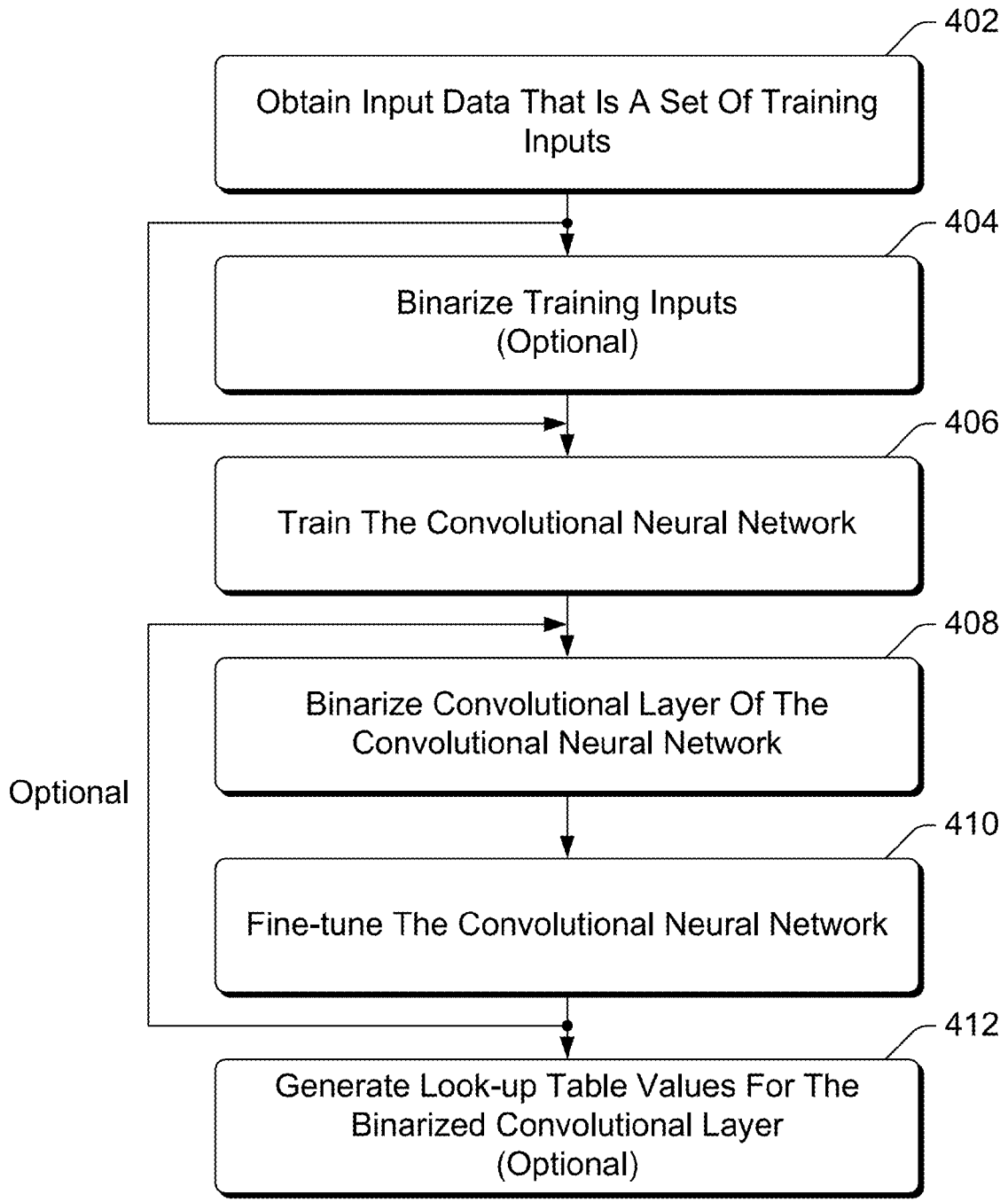
FIG. 4 is a flowchart illustrating an example process for training a convolutional neural network in accordance with one or more embodiments.

FIG. 4 is a flowchart illustrating an example process 400 for training a convolutional neural network in accordance with one or more embodiments. Process 400 is carried out by a fast convolutional neural network system, such as the system 102 of FIG. 1 or FIG. 2, and can be implemented in software, firmware, hardware, or combinations thereof. Process 400 is shown as a set of acts and is not limited to the order shown for performing the operations of the various acts. Process 400 is an example process for training a convolutional neural network; additional discussions of training a convolutional neural network are included herein with reference to different figures.

In process 400, input data that is a set of training inputs is received (act 402). The training inputs refer to input data that is used to train the convolutional neural network to perform the desired analysis, and the nature of these training inputs varies based on the type of analysis to be performed by the convolutional neural network. For example, if the type of analysis to be performed by the convolutional neural network is identification of faces in images, then the set of training inputs includes images that include faces as well as images that do not include faces (e.g., randomly sampled background images).

The training inputs are optionally binarized (act 404). Generally, binarizing data refers to representing the data as a linear combination of bases, each such linear combination including at least one basis that is binary data, and a corresponding coefficient. Binarizing the training inputs refers to converting each input (e.g., each image (or portion of an image), each audio sample, etc.) into a set of coefficients and binary vectors. Each portion of the input (e.g., each pixel in an image (or portion of an image), each frame (of a particular time duration) in an audio sample, etc.) is converted into a coefficient and binary vector, resulting in a set of coefficients $\alpha_1, \ldots, \alpha_m$ and binary vectors $\hat{x}_1, \ldots, \hat{x}_m$ for the input. The coefficients and binary vectors are approximations of the inputs.

For example, assume the input data is a 2×2 grayscale image with four pixel values as follows:

$$\begin{bmatrix} 128 & 128 \\ 64 & 32 \end{bmatrix}.$$

This 2×2 image can be binarized into three binary vectors and three coefficients as follows (shown as binary vector/coefficient):

[1 1 0 0]/128
[0 0 1 0]/64
[0 0 1 1]/32.

Thus, the binarization of the input data results in a set of binary vectors with coefficients identifying the values of each element (each pixel value) of the input data.

The training inputs can be binarized in any of a variety of different manners. In one or more embodiments, the training inputs are binarized by selecting the top m bits (the m most significant bits) of each portion of the input (e.g., the top m bits identifying the color of each pixel in the input). Alternatively, the training inputs can be binarized in other manners. For example, each portion of the input can be compared to a threshold value—if the value of the portion satisfies (e.g., is greater than, or is equal to or greater than) the threshold value then the portion is assigned a value of 1, and if the value of the portion does not satisfy (e.g., is less than, or is equal to or less than) the threshold value then the portion is assigned a value of 0. The value of the portion can be, for example, an intensity value of a pixel, a sound intensity of a frame (e.g., some duration of time, such as several milliseconds) of audio data, and so forth.

It should be noted that binarizing the training inputs in act 404 is optional. Input to the fast convolutional neural network is binarized during regular (non-training) operation of the convolutional neural network as discussed in more detail below, but input to the fast convolutional neural network during the training process 400 need not be binarized.

The convolutional neural network is trained based on the input data (act 406). The convolutional neural network is trained by providing the set of training inputs and an indication of what each training input represents (e.g., whether an image represents a face or not, whether an audio sample matches a particular pattern or not). The manner in which the convolutional neural network is trained varies based on the type of analysis to be performed by the convolutional neural network.

The convolution layer of the convolutional neural network is binarized (act 408). In situations in which the convolutional neural network includes multiple convolution layers, each of the multiple convolution layers can be binarized in act 408 or alternatively a subset of the multiple convolution layers (e.g., one convolution layer) can be binarized in act 408.

As indicated above, binarizing data (regardless of whether the data is input data, values of a convolution layer filter, etc.) refers to representing the data as a linear combination of bases, each such linear combination including at least one basis that is binary data, and a corresponding coefficient. Binarizing the convolution layer refers to converting each filter in the convolution layer into a set of coefficients and binary vectors, resulting in a set of coefficients $\beta_1, \beta_2, \ldots, \beta_n$ and binary vectors $b_1, b_2, \ldots, b_n$ for the input. In one or more embodiments each filter in the convolution layer is binarized, although alternatively only a subset of the filters can be binarized.

Each filter in a convolution layer of a convolutional neural network has one or more values (parameters) referred to as weights, and binarizing a convolution layer of the convolutional neural network refers to binarizing the weights of the filter. These weights are replaced by the binarized weights generated in act 408.

For example, assume the filter is a 2×2 filter with weights as follows:

$$\begin{bmatrix} -0.999984 & -0.736924 \\ 0.511211 & -0.0826997 \end{bmatrix}.$$

This 2×2 filter can be binarized into four pairs of binary vectors and four coefficients as follows (shown as binary vector pair/coefficient):

[0 0 1 0] and [1 1 0 1]/0.528705
[0 0 0 1] and [1 1 1 0]/0.28575
[0 1 1 1] and [1 0 0 0]/0.172893
[1 0 1 1] and [0 0 1 0]/0.0413628.

Thus, the binarization of the filter results in a set of binary vectors (and a set of corresponding binary vectors having elements that are a bitwise logical NOT of the set of binary vectors) with coefficients identifying the values of each weight of the filter.

The filters of the convolution layer can be binarized in any of a variety of different manners. In one or more embodiments, each filter of the convolution layer is binarized using the algorithm illustrated in Table I below. The algorithm in Table I takes as inputs w and n, where w refers to a filter of the convolution layer and n refers to the number of binary bases in the filter. The output of the algorithm is a set of n coefficients $\{\beta_i\}_{i=1}^n$ and a set of n binary vectors $\{b_i\}_{i=1}^n$.

TABLE I

| Line | Instruction |
|---|---|
| 1: | $\epsilon = w$ |
| 2: | for j = 1 to n do |
| 3: | $a_j = \text{sign}(\epsilon)$ |
| 4: | $\beta_j = \frac{\langle a_j, \epsilon \rangle}{\|a_j\|^2}$ |
| 5: | $\epsilon = \epsilon - \beta_j a_j$ |
| 6: | $b_j = a_j^+$ |

Referring to Table I, at line 1 a residual value $\epsilon$ is set equal to the input filter w. At line 2, a for-loop is begun, performing the actions in lines 3-6 n times. At line 3, a temporary vector value $\alpha_j$ is assigned based on the value $\epsilon$, the sign( ) operation returning, for each element in the temporary vector value $\alpha_j$ a value of 1 if the corresponding element of $\epsilon$ is greater than 0, a value of 0 if the corresponding element of $\epsilon$ is equal to 0, and a value of −1 if the corresponding element of E is less than 0. At line 4, a coefficient $\beta_j$ is obtained by dividing the inner product of the temporary vector value $\alpha_j$ and the element $\epsilon$ by the square of the norm of the temporary vector value $\alpha_j$. At line 5, the residual value $\epsilon$ is updated to remove the coefficient $\beta_j$ that was determined in line 4. At line 6, the binary vector element $b_j$ is set equal to 0 or 1 depending on the value of the corresponding element in the temporary vector value $\alpha_j$. The binary vector element $b_j$ is set equal to the maximum of 0 and the value of the corresponding element in the temporary vector value $\alpha_j$. Thus, the binary vector element $b_j$ is set equal to 0 if the value of the corresponding element in the temporary vector value $\alpha_j$ is −1, and is set equal to 1 if the value of the corresponding element in the temporary vector value $\alpha_j$ is 1.

Alternatively, each filter of the convolution layer can be binarized in other manners. For example, each weight calculated for the filter during the training of act 406 can be compared to a threshold value—if the weight satisfies (e.g., is greater than, or is equal to or greater than) the threshold value then the weight is assigned a value of 1, and if the weight does not satisfy (e.g., is less than, or is equal to or less than) the threshold value then the weight is assigned a value of 0.

By way of another example, each weight calculated for the filter during the training of act 406 can be compared to a set of multiple threshold values. If the weight does not satisfy (e.g., is less than, or is equal to or less than) a lowest threshold then the weight is assigned a value of 00. If the weight satisfies (e.g., is greater than, or is equal to or greater than) the lowest threshold value but does not satisfy (e.g., is less than, or is equal to or less than) a next lowest threshold then the weight is assigned a value of 01. If the weight satisfies (e.g., is greater than, or is equal to or greater than) the next lowest threshold value but does not satisfy (e.g., is less than, or is equal to or less than) a highest threshold then the weight is assigned a value of 10. If the weight satisfies (e.g., is greater than, or is equal to or greater than) the highest threshold then the weight is assigned a value of 11.

The convolutional neural network is also fine-tuned (act 410). Fine-tuning the convolutional neural network refers to modifying later layers of the convolutional neural network in response to a change to one or more earlier layers. In process 400, the change to the one or more earlier layers is the binarization of the convolution layer in act 408. To fine-tune the convolutional neural network, the later layers are further trained by again applying the training inputs to the convolutional neural network. The earlier layers provide various outputs to later layers in the convolutional neural network, and these earlier layers are not modified during the fine-tuning but that later layers are modified during the fine-tuning. For example, all layers downstream from the convolution layer that was binarized in act 408 are modified during the fine-tuning. This allows layers downstream from the convolution layer to be adjusted or updated in light of the changes that were made to the convolution layer in act 408.

The binarization in act 408 and the fine-tuning in act 410 can optionally be repeated one or more times. The binarization and fine-tuning can be repeated a particular number of times (e.g., three to five times), or repeated until some other conditions are met (e.g., the difference in values of one or more layers in the convolutional neural network between different performances of the fine-tuning in act 410 is less than a threshold amount). Repeating the binarization and fine-tuning can include changing the technique used to binarize the convolution layer, for example alternating between two techniques each time the binarization is performed, selecting a different technique each time the binarization is performed, and so forth.

Repeating the binarization and fine-tuning can also include binarizing different layers each time the binarization and fine-tuning is performed. For example, a convolutional neural network may include multiple convolution layers, as discussed above. One of the multiple convolution layers (e.g., the convolution layer upstream from the other convolution layers) can be binarized in act 408, then the convolutional neural network can be fine-tuned in act 410. The binarization in act 408 can then be repeated, but performed on a different one of the multiple convolution layers, and then the convolutional neural network can again be fine-tuned in act 410. This binarization and fine-tuning can be repeated as needed so that each convolution layer of the multiple convolution layers is binarized.

Look-up table values are optionally generated for the binarized convolution layer (act 412). The binarization of the convolution layer in act 408 reduces, for a given filter in the convolution layer, the number of possible binary patterns over any input data to be no larger than $2^l$, where l refers to the size of the filter (the number of weights or parameters the filter has). For example, if the filter were a 3×3 filter, then the size of the filter is 9, and the number of possible binary patterns over any input data for the filter is no larger than $2^9$, which is 512.

Given this relatively small number of possible binary patterns (relative to the number that would be possible without binarization), the possible results for the convolution layer can be pre-computed and stored in one or more look-up tables. Thus, during operation of the convolutional neural network as discussed in more detail below, rather than performing the convolution on the input data, the pre-computed result can be obtained from the look-up table.

In one or more embodiments, where n refers to the number of binary bases in a filter and m refers to the number of binary bases in the input data, the n×m look-up tables are pre-computed. The binary vectors $\hat{x}_1, \ldots, \hat{x}_m$ are the index into the look-up tables, and the pre-computed value is determined as:

$$LUT_{i,j}[\hat{x}_i] = \beta_j(\alpha_i(2\langle b_j, \hat{x}_i\rangle - |\hat{x}_i|))$$

where $LUT_{i,j}$ refers to a pre-computed look-up table (LUT) for a particular binary basis i of input data and a particular binary basis j of the filter, $\hat{x}_i$ refers to a binary vector of the input data, $\beta_j$ to the coefficient for the binary basis j, $\alpha_i$ refers to the coefficient for the binary basis i, $b_j$ refers to the binary basis j, $\langle b_j, \hat{x}_i\rangle$ refers to the inner product of $b_j$ and $\hat{x}_i$, and $|\hat{x}_i|$ refers to the absolute value of $\hat{x}_i$.

The look-up table generated in act 412 corresponds to the convolutional neural network being trained in process 400. The look-up table can be maintained as (e.g., stored as) part of the convolutional neural network, or alternatively can be maintained separately from the convolutional neural network (e.g., stored elsewhere, but the convolutional neural network or other mechanism maintaining the correspondence between the convolutional neural network and the look-up table).

Figure 5:
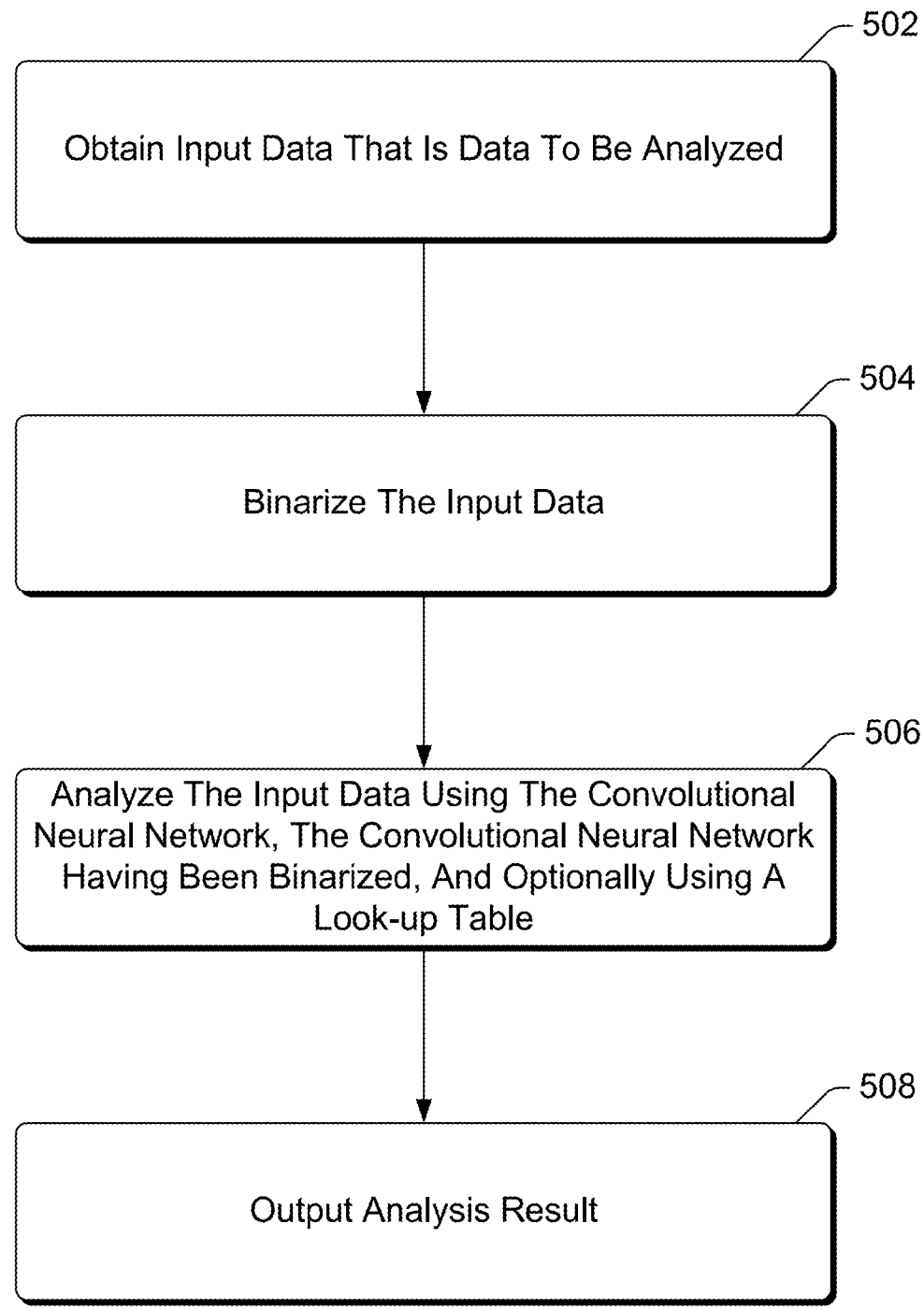
FIG. 5 is a flowchart illustrating an example process for using a trained convolutional neural network in accordance with one or more embodiments.

FIG. 5 is a flowchart illustrating an example process 500 for using a trained convolutional neural network in accordance with one or more embodiments. Process 500 is carried out by a fast convolutional neural network system, such as the system 102 of FIG. 1 or FIG. 2, and can be implemented in software, firmware, hardware, or combinations thereof. Process 500 is shown as a set of acts and is not limited to the order shown for performing the operations of the various acts. Process 500 is an example process for using a trained convolutional neural network; additional discussions of using a trained convolutional neural network are included herein with reference to different figures.

In process 500, input data that is to be analyzed is received (act 502). The input data varies based on the type of analysis to be performed by the convolutional neural network and the type of analysis for which the convolutional neural network was trained (e.g., in process 400 discussed above). The obtained input data can be image data, video data, audio data, or other types of data as discussed above.

The input data is binarized (act 504). Generally, binarizing data refers to representing the data as a linear combination of bases, each such linear combination including at least one basis that is binary data, and a corresponding coefficient as discussed above. The input data can be binarized in any of a variety of different manners discussed above with respect to act 404 of FIG. 4, although the input data in act 504 is not training data. The input data can be binarized in act 504 in the same manner as training data was binarized in act 404 of FIG. 4, or alternatively the input data can be binarized in act 504 in a different manner than the training data was binarized in act 404 of FIG. 4.

The input data is analyzed using the convolutional neural network (act 506). The convolutional neural network in act 506 was previously binarized, which refers to one or more convolution layers in the convolutional neural network having been binarized as discussed above. The convolutional neural network can optionally use a look-up table for the convolution layer, as discussed above.

The convolution layer having been binarized, as well as the input data having been binarized in act 504, allows for an increase in speed at which the convolution performed by the convolution layer of the convolutional neural network can be performed. Given the binarization of the convolution layer and the input data, the convolution performed by the convolution layer can be approximated as follows:

$$\langle w, x\rangle \approx \sum_{j=1}^{n} \beta_j(2\langle b_j, x\rangle - |x|)$$

where w refers to a filter of the convolution layer, x refers to the input data, $\langle w, x\rangle$ refers to the convolution of the filter and the input data, n refers to the number of binary bases in the filter, $\beta_j$ refers to the coefficient for the binary basis j of the filter, $b_j$ refers to the binary basis j, $\langle b_j, x\rangle$ refers to the inner product of $b_j$ and x, and $|x|$ refers to the absolute value of x.

The binarized input data is a set of coefficients $\alpha_1, \ldots, \alpha_m$ and binary vectors $\hat{x}_1, \ldots, \hat{x}_m$ as discussed above. The convolution of the filter w over the input data x can then be computed as follows:

$$\langle w, x\rangle \approx \sum_{j=1}^{n} \beta_j \left(\sum_{i=1}^{m} \alpha_i(2\langle b_j, \hat{x}_i\rangle - |\hat{x}_i|)\right)$$

where w refers to a filter of the convolution layer, x refers to the input data, $\langle w, x\rangle$ refers to the convolution of the filter and the input data, n refers to the number of binary bases in the filter, $\beta_j$ refers to the coefficient for the binary basis j of the filter, $\alpha_i$ refers to the coefficient for the binary basis i of input data, $b_j$ refers to the binary basis j, $\hat{x}_i$ refers to a binary vector of the input data, $\langle b_j, \hat{x}_i\rangle$ refers to the inner product of $b_j$ and $\hat{x}_i$, and $|\hat{x}_i|$ refers to the absolute value of $\hat{x}_i$. The inner product of the two binary vectors $\langle b_j, \hat{x}_i\rangle$ can be computed using the bitwise logical AND and POPCNT instructions to increase the speed of performance of the convolution.

The convolution can be performed as discussed above, or alternatively the results of the convolution can have been pre-computed and stored in one or more look-up tables as discussed above. In situations in which the look-up tables have been pre-computed, the convolution of the filter w over the input data x can then be computed as follows:

$$\langle w, x \rangle = \sum_j \sum_i LUT_{i,j}[\hat{x}_i]$$

where w refers to a filter of the convolution layer, x refers to the input data, <w, x> refers to the convolution of the filter and the input data, $LUT_{i,j}$ refers to a pre-computed look-up table (LUT) for a particular binary basis i of input data and a particular binary basis j of the filter, and $\hat{x}_i$ refers to a binary vector of the input data.

The analysis result is output (act 508). The analysis result can be output in different manners based on the type of the input data and the analysis performed by the convolutional neural network, as discussed above.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
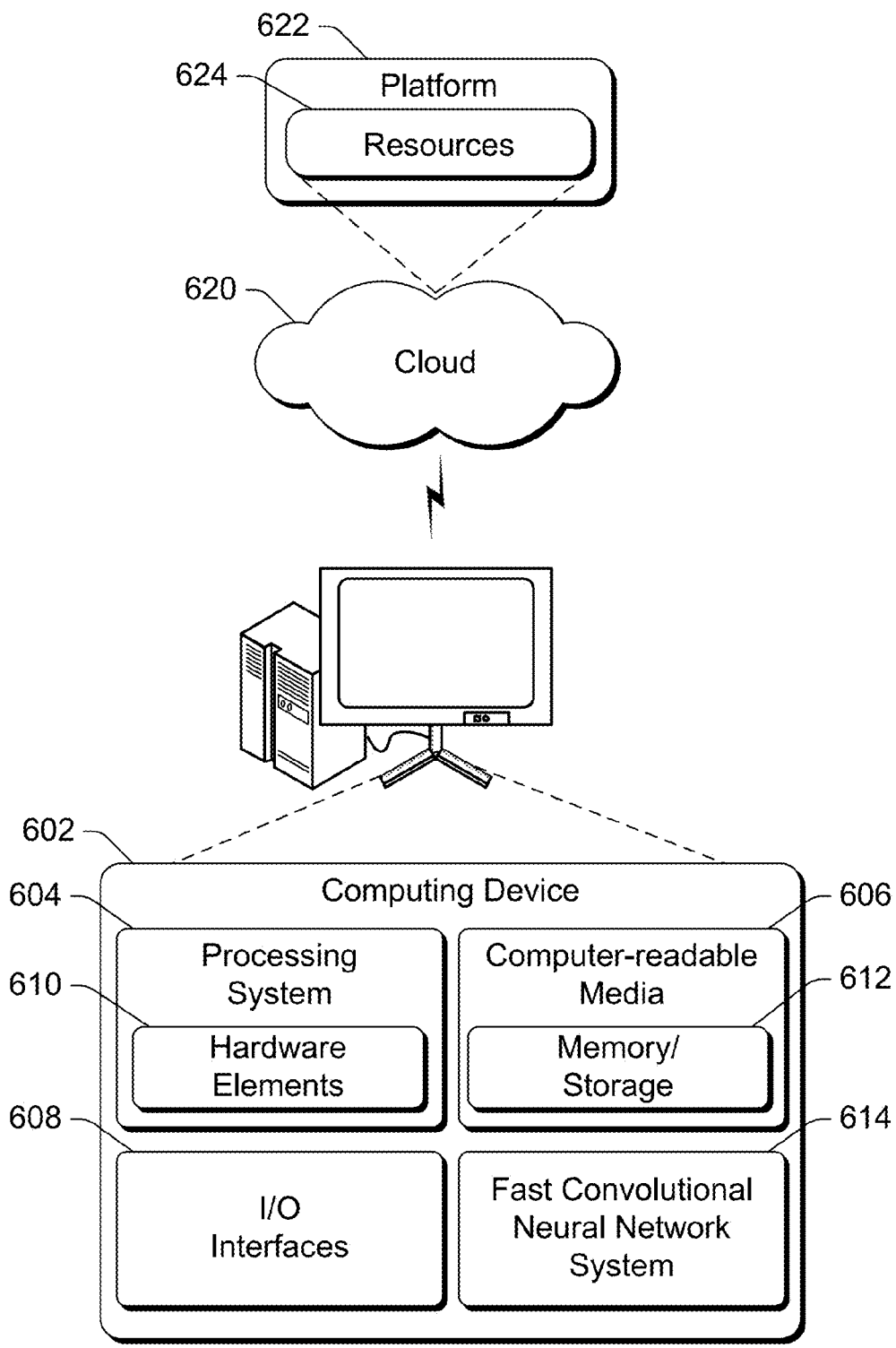
FIG. 6 illustrates an example system generally that includes an example computing device that is representative of one or more computing systems and/or devices that may implement the various techniques described herein.

FIG. 6 illustrates an example system generally at 600 that includes an example computing device 602 that is representative of one or more computing systems and/or devices that may implement the various techniques described herein. This is illustrated through inclusion of the fast convolutional neural network system 614, which may be configured to detect faces or other objects in images as discussed above. Computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 604 is representative of functionality to perform one or more operations using hardware. Accordingly, processing system 604 is illustrated as including hardware elements 610 that may be configured as processors, functional blocks, and so forth. This may include implementation in hardware as an application specific integrated circuit or other logic device formed using one or more semiconductors. Hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable storage media 606 is illustrated as including memory/storage 612. Memory/storage 612 represents memory/storage capacity associated with one or more computer-readable media. Memory/storage component 612 may include volatile media (such as random access memory (RAM)) and/or nonvolatile media (such as read only memory (ROM), Flash memory, optical disks, magnetic disks, and so forth). Memory/storage component 612 may include fixed media (e.g., RAM, ROM, a fixed hard drive, and so on) as well as removable media (e.g., Flash memory, a removable hard drive, an optical disc, and so forth). Computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by computing device 602. By way of example, and not limitation, computer-readable media may include "computer-readable storage media" and "computer-readable signal media."

"Computer-readable storage media" refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. Computing device 602 may be configured to implement particular instructions and/or functions corresponding to the software and/or hardware modules. Accordingly, implementation of a module that is executable by computing device 602 as software may be achieved at least partially in hardware, e.g., through use of computer-readable storage media and/or hardware elements 610 of processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of computing device 602 and are not limited to the specific examples of the techniques described herein. This functionality may also be implemented all or in part through use of a distributed system, such as over a "cloud" 620 via a platform 622 as described below.

Cloud 620 includes and/or is representative of a platform 622 for resources 624. Platform 622 abstracts underlying functionality of hardware (e.g., servers) and software resources of cloud 620. Resources 624 may include applications and/or data that can be utilized while computer processing is executed on servers that are remote from computing device 602. Resources 624 can also include services provided over the Internet and/or through a subscriber network, such as a cellular or Wi-Fi network.

Platform 622 may abstract resources and functions to connect computing device 602 with other computing devices. Platform 622 may also serve to abstract scaling of resources to provide a corresponding level of scale to encountered demand for resources 624 that are implemented via platform 622. Accordingly, in an interconnected device embodiment, implementation of functionality described herein may be distributed throughout system 600. For example, the functionality may be implemented in part on computing device 602 as well as via platform 622 that abstracts the functionality of the cloud 620.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   obtaining, by at least one computing device, input data that is a set of training inputs for a convolutional neural network, the convolutional neural network including multiple layers, one of the multiple layers including a convolution layer, the convolution layer including one or more filters;
   training, by the at least one computing device, the convolutional neural network based on the set of training inputs;
   binarizing, by the at least one computing device, the convolution layer by converting parameters of the one or more filters from floating point to binary values;
   generating, by the at least one computing device, look-up table values of a look-up table for the binary values, the look-up table storing pre-computed results that are possible for the convolution layer; and
   outputting, by the at least one computing device, a result of the generating.

2. A method as recited in claim 1, the binarizing the convolution layer comprising converting each filter in the convolution layer into a set of coefficients and binary vectors.

3. A method as recited in claim 1, further comprising binarizing, prior to training the convolutional neural network, the input data.

4. A method as recited in claim 3, the binarizing the input data comprising converting each training input into a set of coefficients and binary vectors.

5. A method as recited in claim 1, further comprising fine-tuning the convolutional neural network, after binarizing the convolution layer, by again applying the training inputs to the convolutional neural network to adjust ones of the multiple layers in the convolutional neural network later than the convolution layer.

6. A method as recited in claim 1, further comprising repeating the binarizing the convolution layer and fine-tuning the convolutional neural network.

7. A method as recited in claim 1, the multiple layers including multiple convolution layers, and the binarizing comprising binarizing each of the multiple convolution layers.

8. A method as recited in claim 1, further comprising pre-computing the possible results for the convolution layer and storing the pre-computed results in the look-up table.

9. A method comprising:
   obtaining, by at least one computing device, input data that is to be analyzed by a convolutional neural network, the convolutional neural network including multiple layers, one of the multiple layers including a convolution layer, the convolution layer including one or more filters, each of the one or more filters having been binarized by being converted from floating point to binary values;

binarizing, by the at least one computing device, the input data by converting the input data to a set of binary vectors;

determining, by the at least one computing device, at the convolution layer, a convolution of the binarized one or more filters over the binarized input data, the determining including accessing, based on a binary vector of the set of binary vectors, a look-up table storing pre-computed results for the convolution layer, the pre-computed results used as the convolution of the binarized one or more filters over the binarized input data; and outputting, by the at least one computing device, a result of the determining.

10. A method as recited in claim 9, the binarizing the input data comprising converting the input data into a first set of coefficients and binary vectors, and the one or more filters having been binarized by being converted into a second set of coefficients and binary vectors.

11. A method as recited in claim 9, the result comprising an indication of one or more faces detected in the image.

12. A method as recited in claim 9, the multiple layers including multiple convolution layers, each of the multiple convolution layers having been binarized by being converted from floating point to binary values.

13. A method as recited in claim 9, the binarized one or more filters including a first set of binary vectors and the binarized input data including a second set of binary vectors, the determining a convolution of the binarized one or more filters over the binarized input data comprising using bitwise logical AND and population count instructions to compute an inner product of one of the first set of binary vectors and one of the second set of binary vectors.

14. A convolutional neural network system comprising:
a data access module implemented by at least one computing device to obtain input data;
a convolutional neural network implemented by the at least one computing device and including multiple layers, one of the multiple layers including a convolution layer, the convolution layer including one or more filters, each of the one or more filters having been binarized by being converted from floating point to binary values as a first set of binary vectors;
a binarization module implemented by the at least one computing to binarize the input data by converting the input data to binary values as a second set of binary vectors;
the convolutional neural network being further configured by the at least one computing device to determine, at the convolution layer, a convolution of the binarized one or more filters over the binarized input data using bitwise logical AND and population count instructions to compute an inner product of one of the first set of binary vectors and one of the second set of binary vectors; and
an output module implemented by the at least one computing device to output a result of the analyzing.

15. A convolutional neural network system as recited in claim 14, the binarization module being configured to binarize the input data by converting the input data into a set of coefficients and binary vectors.

16. A convolutional neural network system as recited in claim 14, the one or more filters having been binarized by being converted into a set of coefficients and binary vectors.

17. A convolutional neural network system as recited in claim 14, the input data comprising an image, and the result comprising an indication of one or more faces detected in the image.

18. A convolutional neural network system as recited in claim 14, the binarized input data including a set of binary vectors, the determining a convolution of the binarized one or more filters over the binarized input data comprising accessing, based on a binary vector of the set of binary vectors, a look-up table storing pre-computed results for the convolution layer, and using the pre-computed results as the convolution of the binarized one or more filters over the binarized input data.

19. A method as recited in claim 1, wherein the input data comprises audio, and the result comprising an indication of whether an audio sample matches a particular pattern.

20. A convolutional neural network system as recited in claim 14, wherein the input data comprises audio, and the result comprising an indication of whether an audio sample matches a particular pattern.

* * * * *